United States Patent
Sherrill

(10) Patent No.: US 8,840,391 B1
(45) Date of Patent: Sep. 23, 2014

(54) DROOL SHIELD FOR INJECTION MOLDING

(71) Applicant: Dan Sherrill, Lewisville, TX (US)

(72) Inventor: Dan Sherrill, Lewisville, TX (US)

( * ) Notice: Subject to any disclaimer, the term of this patent is extended or adjusted under 35 U.S.C. 154(b) by 21 days.

(21) Appl. No.: 13/986,088

(22) Filed: Mar. 29, 2013

(51) Int. Cl.
*B29C 45/20* (2006.01)
*B29C 45/17* (2006.01)
*B29C 45/27* (2006.01)

(52) U.S. Cl.
CPC ......... *B29C 45/1755* (2013.01); *B29C 45/2708* (2013.01); *B29C 45/27* (2013.01)
USPC .......................................... 425/151; 425/567

(58) Field of Classification Search
CPC .. B29C 45/27; B29C 45/2708; B29C 45/1755
USPC .......... 425/151, 169, 171, 173, 567, 569, 574
See application file for complete search history.

(56) References Cited

U.S. PATENT DOCUMENTS

| | | | |
|---|---|---|---|
| 3,934,626 A * | 1/1976 | Hall .............................. | 141/117 |
| 4,199,311 A * | 4/1980 | Ferris et al. ................... | 425/173 |
| 4,917,595 A * | 4/1990 | Nakamura et al. ............ | 425/567 |
| 5,112,214 A * | 5/1992 | Glatt, Jr. ....................... | 425/567 |
| 5,460,505 A * | 10/1995 | Ito et al. ........................ | 425/151 |
| 5,593,711 A * | 1/1997 | Glaesener ...................... | 425/595 |
| 6,220,850 B1 * | 4/2001 | Catoen et al. ................. | 425/549 |
| 2003/0235638 A1 * | 12/2003 | Gellert .......................... | 425/568 |
| 2005/0031728 A1 * | 2/2005 | Babin et al. ................... | 425/549 |
| 2008/0317897 A1 * | 12/2008 | Asaoka et al. ................ | 425/549 |
| 2009/0074907 A1 * | 3/2009 | Gunther ........................ | 425/549 |
| 2013/0022705 A1 * | 1/2013 | Hammond .................... | 425/567 |

* cited by examiner

*Primary Examiner* — Yogendra Gupta
*Assistant Examiner* — Emmanuel S Luk
(74) *Attorney, Agent, or Firm* — David G. Moore

(57) ABSTRACT

The invention disclosed herein is a device to prevent damage from molten plastic to electrical wiring, heater bands and insulation of an injection molding machine. Specifically, the device consists of a flat metal disc with an aperture in the center which attaches to the distal end of the nozzle housing of an injection molding machine. When the nozzle of the injection molding machine extends through the aperture of the flat metal disc to inject molten plastic into a mold, the flat metal disc prevents molten plastic from entering the nozzle housing and damaging the electrical wiring, heater bands and insulation of the injection molding machine.

1 Claim, 3 Drawing Sheets

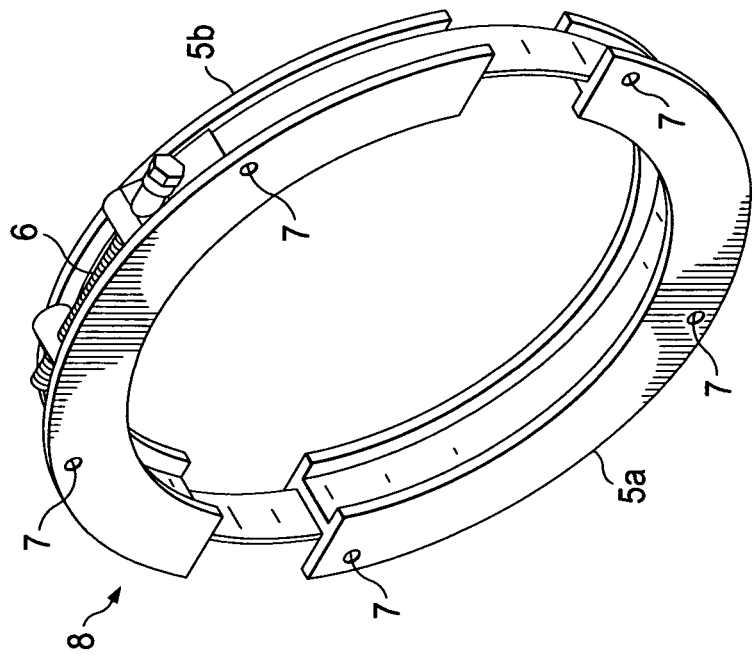
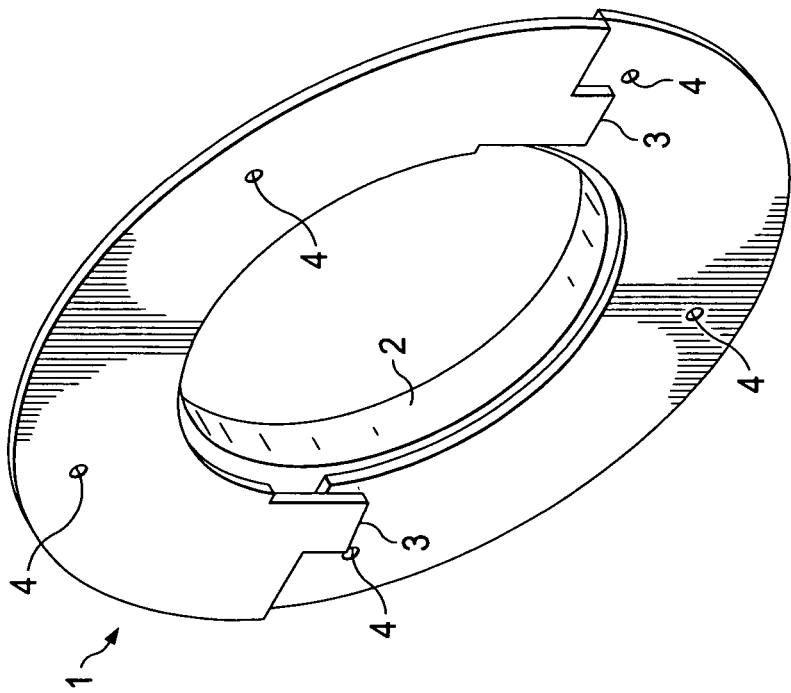
FIG. 1
FIG. 2

DROOL SHIELD FOR INJECTION MOLDING

CROSS-REFERENCE TO RELATED APPLICATIONS

This application seeks the benefit of and priority to U.S. Provisional Patent Application No. 61/686,104 filed on Mar. 30, 2012 and which is incorporated herein by reference.

STATEMENT REGARDING FEDERALLY SPONSORED RESEARCH OR DEVELOPMENT

No part of the invention disclosed herein was the subject of federally sponsored research or development.

THE NAMES OF THE PARTIES TO A JOINT RESEARCH AGREEMENT

None

REFERENCE TO A SEQUENCE LISTING

Not applicable.

BACKGROUND OF THE INVENTION

1. Field

The field of the invention disclosed herein is plastic injection molding and a device to prevent damage to heater bands, electrical wiring and insulation by molten plastic in an injection molding machine.

2. Description of the Prior Art

Plastic molding is a process using plastic and other materials that when heated can be molded into a variety of products. The molding material is made by heating polymers including thermoplastics, thermosets and elastomers alone or in combination until the molding material is liquid. The liquid molding material may be heated to approximately 400-500° F. and is transported through piping to molds into which the liquid molding material is injected. The molds are then subjected to high pressure in order to conform the molding material to the contours of the mold. The molding material is then allowed to cool until hard at which time it is removed from the mold following which it may undergo further processing to the finished product.

The molten plastic or melt is injected under pressure into a mold through a nozzle which is inserted into the mold opening and through which melt is injected. The nozzle is surrounded by heater bands, electrical wiring and insulation to ensure that the plastic remains molten until injected into the mold. The nozzle remains inside of the injection machine until it is needed to fill a mold with molten plastic. This insures that the nozzle will remain at appropriate temperature to permit the free flow of molten plastic into the mold. When a mold is to be filled with molten plastic, the nozzle is extended from the nozzle housing and into the opening of the mold into which molten plastic is injected. After the molten plastic is injected into the mold, the nozzle is withdrawn into the nozzle housing so that the nozzle will remain at the proper temperature for the next injection of molten plastic into the mold. On occasion, molten plastic will drip or "drool" from the nozzle and enter the nozzle housing where it can damage the heater bands, electrical wiring and insulation. This requires that the injection molding machine be shut down and allowed to cool so that the operator of the injection molding machine can replace the damaged electrical wires, heater bands and/or insulation. This repair operation is costly because the injection molding machine is not operating and repair of the injection molding machine requires a significant expenditure of money for installation of new parts. What is needed in the art is a device which prevents molten plastic or drool escaping from the nozzle from entering the nozzle housing and damaging electrical wiring, heater bands and/or insulation of an injection molding machine.

BRIEF DESCRIPTION OF THE INVENTION

The invention disclosed herein is a device which prevents molten plastic or drool escaping from the nozzle from entering the nozzle housing and damaging electrical wiring, heater bands and/or insulation of an injection molding machine. Specifically, the invention disclosed herein is composed of an adjustable "drool shield" which prevents the molten plastic from the nozzle of an injection molding machine from entering the nozzle housing and damaging the electrical wiring, heater bands and/or insulation of the injection molding machine.

The drool shield may be constructed from lightweight, sturdy aircraft aluminum and designed to withstand temperatures up to 700° F. The drool shield is composed of two parts. The first part is an adjustable flat disc with an aperture in the center of the disc which fits snugly over the nozzle housing. The other component is an attachment mechanism consisting of an adjustable ring which also fits over the nozzle housing. Once the flat disc and ring are sized to snugly enclose the nozzle housing, the flat disc and ring are securely joined by threaded fasteners. The drool shields are quickly installed and secured to the nozzle housing with a stainless steel clamp which is adjustable to properly fit different sizes of nozzle housings. The drool shields are reusable and constructed of various sizes which are individually adaptable to fit many different sizes of injection molding nozzle housings.

BRIEF DESCRIPTION OF THE DRAWING FIGURES

A better understanding of the invention disclosed herein may be had by examination of the attached drawing/figures.

FIG. 1 is a view of the drool shield disc.

FIG. 2 is a view of the drool shield attachment mechanism.

DETAILED DESCRIPTION OF THE INVENTION

Figure 3:
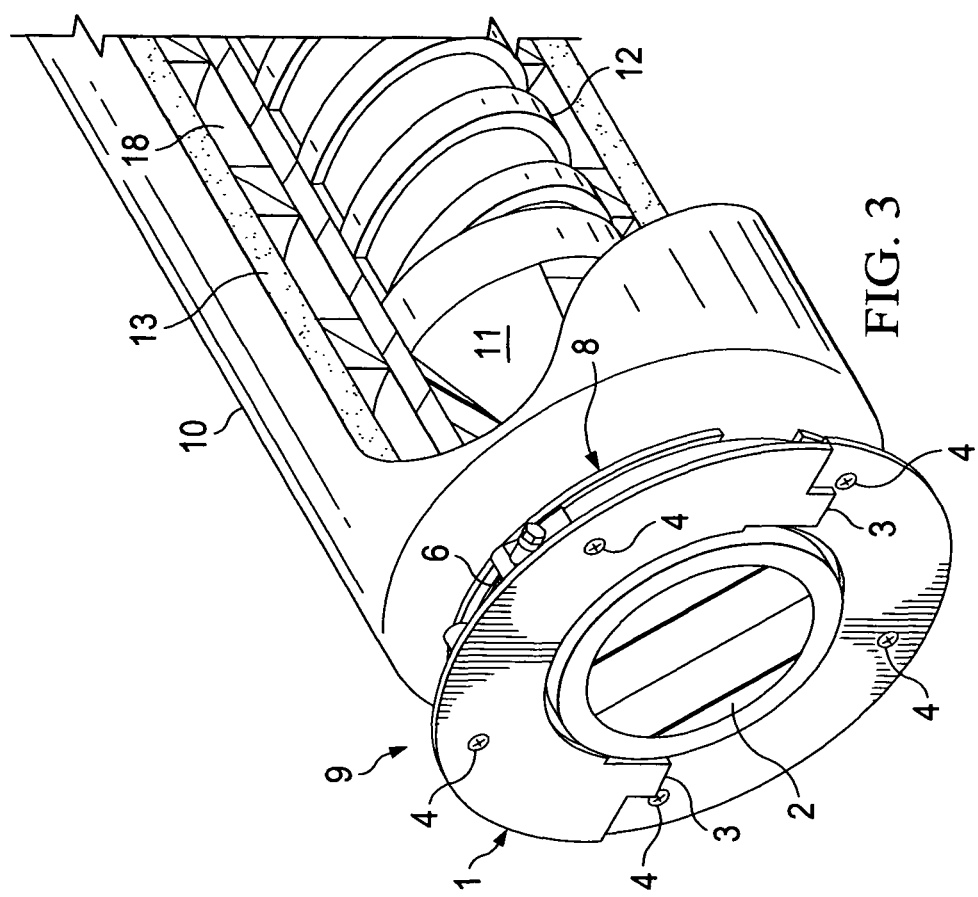
FIG. 3 is a view of the drool shield attached to the nozzle housing of an injection molding machine

The invention disclosed herein is a device to prevent molten plastic from entering the nozzle housing of an injection molding machine and damaging the electrical wiring, heater bands and/or insulation of the injection molding machine. Specifically, the device disclosed herein consists of a disc with an aperture attached to the nozzle housing and through which the nozzle of the injection molding device extends and injects molten plastic into the mold.

As shown in FIG. 1 the drool shield consists of a disc 1 with an aperture 2 through which the nozzle of the injection molding device can extend and inject molten plastic into the mold. The disc 1 is constructed with adjustment tabs 3 to permit the disc 1 to fit various sizes of nozzle housings. The disc 1 is also constructed with various attachment points 4 which permit the disc 1 to be attached by threaded fasteners to the attachment mechanism 8 shown in FIG. 2.

The attachment mechanism 8 shown in FIG. 2 consists of two half rings 5a and 5b designed and constructed to securely hold a clamping mechanism 6. The attachment assembly 8 is placed around the nozzle housing of the injection molding machine and the clamp 6 is tightened to securely hold the two half rings 5a and 5b of the attachment mechanism 8 in place around the nozzle housing. Once attached the two half rings 5a and forms a complete ring around the nozzle housing. The attachment mechanism 8 is designed and constructed with various attachment points 7 to permit the disc 1 to be securely fastened to the attachment mechanism 8. The disc 1 of the drool shield is fastened to the attachment mechanism 8 by threaded fasteners which extend through the attachment points 4 on the drool shield disc 1 and fit into corresponding attachment points 7 on the assembly mechanism 8. The drool shield components are constructed from lightweight, sturdy aircraft aluminum or other sturdy heat resistant material and designed to withstand temperatures up to 700° F. The clamp 6 which holds the drool shield in place on the nozzle housing is constructed from stainless steel or other sturdy heat resistant material.

As shown in FIG. 3, the drool shield 9 is attached to the distal end (the end of the nozzle housing nearest the mold) of the nozzle housing 10 by the clamp 6 of the attachment mechanism 8. The disc 1 is attached to the attachment mechanism 8 by threaded fasteners extending from attachment points 4 on the disc 1 to corresponding attachment points 7 on the attachment mechanism 8. During use, the nozzle 11 extends through the aperture 2 of the drool shield 9 into the mold where the mold is filled with molten plastic. The heater bands 12 and insulation 13 are protected from damage by the drool shield 9 which prevents molten plastic from entering the nozzle housing 10. The nozzle 11, heater bands 12 and nozzle barrel 18 and insulation 13 are contained within the nozzle housing 10.

Figure 4:
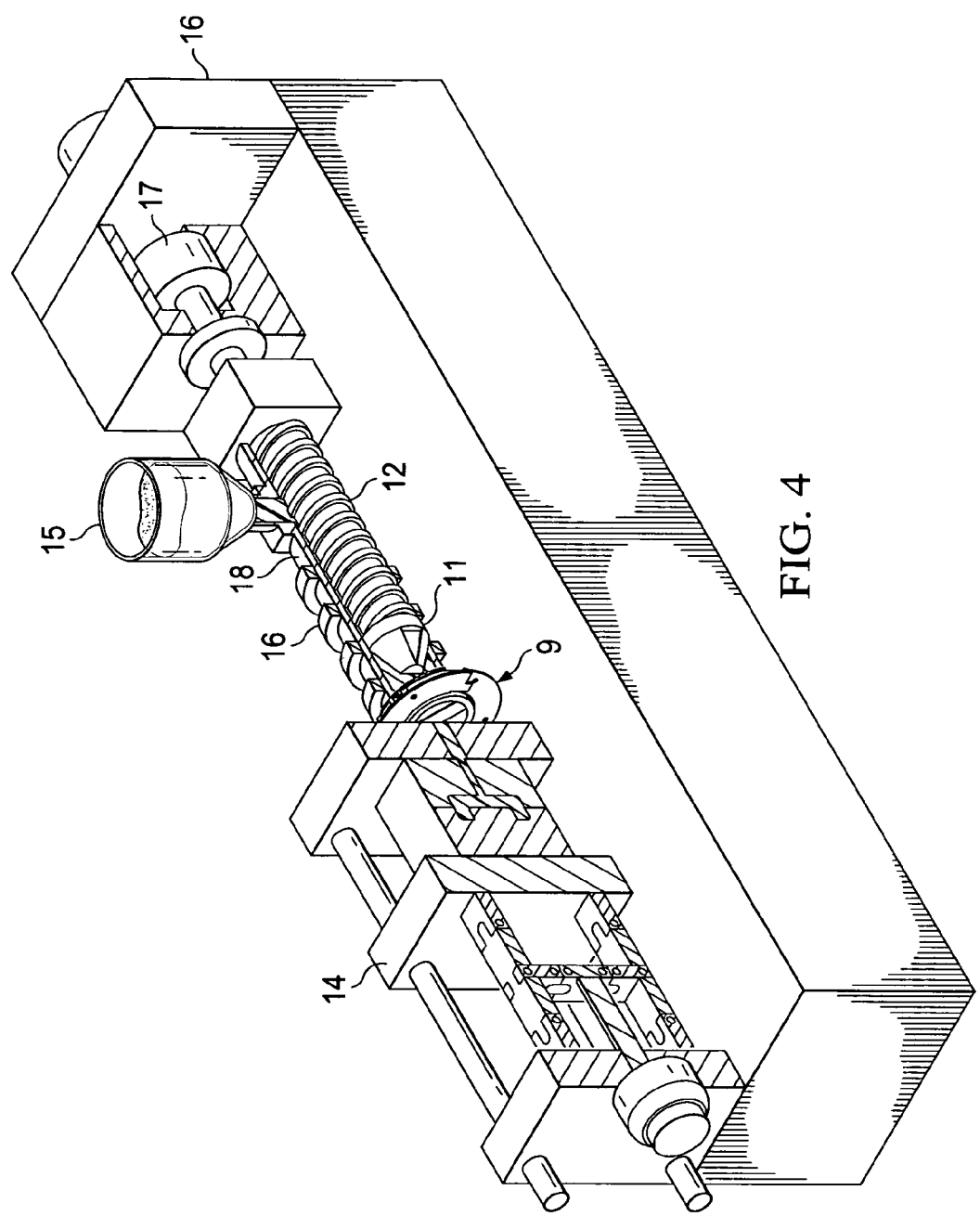
FIG. 4 is a view of the injection molding machine with the drool shield attached to the injection molding machine.

The operating parts of the injection molding machine 16 are shown in FIG. 4. The injection molding machine 16 is filled with solid plastic spheres through a hopper 15 which enters into the nozzle barrel 18 of the injection molding machine 16 and are heated to approximately 450° F. by a plurality of heater bands 12. Once the plastic is fully melted and the mold 14 is in place, the nozzle 11 extends through the aperture of the drool shield 9 to the opening of the mold 14. A pump 17 located at the proximal end of the nozzle housing 10 then injects molten plastic into the mold 14. Molten plastic is prevented from entering the nozzle housing 10 and damaging the electrical wiring, heater bands and/or surrounding insulation by the drool shield 9. After the plastic has hardened the mold 14 is removed from the injection molding machine 16 and the article is removed from the mold 14.

The drool shield for injection molding can be constructed from a variety of sturdy heat resistant materials and constructed of various sizes to fit many different sizes of injection molding machines. These other embodiments are part of the invention disclosed in this specification and as further defined by the appended claims.

I claim:

1. A device attached to the distal end of a nozzle housing of an injection molding machine which prevents molten plastic from entering the nozzle housing and damaging the electrical wiring, heater bands and/or insulation of an injection molding machine comprising:

an adjustable flat metal disc with an aperture in the center;

two metal half-rings adjustably securely attached to the distal end of said nozzle housing to form a complete ring around said nozzle housing by a clamp;

said adjustable flat metal disc attached by threadable fasteners to said completed ring located on the distal end of said nozzle housing.

\* \* \* \* \*